(12) United States Patent
Kiviranta et al.

(10) Patent No.: US 6,351,084 B1
(45) Date of Patent: Feb. 26, 2002

(54) METHOD AND A DEVICE FOR REDUCING AN ELECTRIC FIELD PRODUCED BY A CATHODE RAY TUBE IN ITS SURROUNDINGS

(75) Inventors: Lasse Kiviranta, Raatala; Jari Pistemaa, Hiisi, both of (FI)

(73) Assignee: Nokia Display Products Oy, Salo (FI)

( * ) Notice: Subject to any disclaimer, the term of this patent is extended or adjusted under 35 U.S.C. 154(b) by 0 days.

(21) Appl. No.: 09/497,055

(22) Filed: Feb. 2, 2000

(30) Foreign Application Priority Data

Feb. 5, 1999 (FI) .................................................. 990219

(51) Int. Cl.[7] .............................................. G09G 1/28
(52) U.S. Cl. ........................... 315/368.18; 315/368.19; 315/368.25; 315/403; 313/452; 345/10; 345/11
(58) Field of Search ................... 315/368.18, 368.19, 315/403, 368.25, 8; 345/10, 11; 313/452

(56) References Cited

U.S. PATENT DOCUMENTS

| 5,243,262 A | 9/1993 | Moen | 315/370 |
| 5,569,985 A | * 10/1996 | Griepentrog | 315/403 |
| 5,585,691 A | * 12/1996 | Washburn | 313/452 |
| 5,726,538 A | 3/1998 | Jackson et al. | 315/370 |
| 6,046,721 A | * 4/2000 | Song et al. | 315/132 |
| 6,181,088 B1 | * 1/2001 | Gu | 315/368.18 |

FOREIGN PATENT DOCUMENTS

| EP | 0774743 A2 | 5/1997 |
| GB | 2273230 | 6/1994 |
| GB | 2274760 A | 8/1994 |

* cited by examiner

*Primary Examiner*—Don Wong
*Assistant Examiner*—Jimmy T. Vu
(74) *Attorney, Agent, or Firm*—Pearman & Green, LLP

(57) ABSTRACT

The invention relates to a method and a device for reducing an electric field produced by display devices equipped with cathode ray tubes, in their surroundings. According to the invention, a part of a spectrum (ff), caused by a picture content, the level of which is separately adjusted, is discriminated from an interference voltage frequency spectrum (fs), produced by the display terminal and caused by deflection signals (fv, fh). Spurious pulses, significant for the generation of the electric field, are connected to a compensation circuit, wherein they are summed and supplied to a common emitter. The directions of the pulses are determined so that the electric field produced by the emitter reverses the field produced by the display device.

15 Claims, 3 Drawing Sheets

METHOD AND A DEVICE FOR REDUCING AN ELECTRIC FIELD PRODUCED BY A CATHODE RAY TUBE IN ITS SURROUNDINGS

FIELD OF THE INVENTION

The present invention relates to a method and a device for reducing a variable electric field produced by a Cathode Ray Tube (CRT) and equipment controlling it, in its surroundings.

BACKGROUND OF THE INVENTION

Many electronic devices produce in their surroundings electric and magnetic fields. The inductances, circuit board and wirings of circuits that control a cathode ray tube produce around them an electric field with a variable frequency. The anode of a cathode ray tube also produces around it an electric field with a variable frequency, because the voltage pulses that occur in a deflecting coil connect via capacitance between the deflecting coil and the anode to the anode and further to the surroundings.

Equipment-specific limit values have been defined for electronic devices, such as display terminals equipped with a cathode ray tube, the aim of which is to limit the fields in question. Normally, the limit values are defined as electric field strengths.

FIG. 1 shows, in a simplified manner, the operating principle of a cathode ray tube. At the end of the neck part of the tube, there is an electron gun (egun), which produces an electron beam e. The electron beam is directed onto an image surface at an acceleration voltage which is connected to the tube's anode A. In addition, the electron beam is modified by control grids G, situated on the tube neck. Around the tube neck part, there are vertical and horizontal deflecting coils Def by means of which the electron beam is directed so that it sweeps the image surface by line from top to bottom. High pulse-like voltages occur in the tube's deflecting coils and, therefore, the deflecting coils and the conductors connected thereto produce directly around them an electric field and a magnetic field, which is proportional to the voltage in the coils. The voltage pulses that occur in the deflecting coils are also connected to the tube's anode due to capacitance between the deflecting coil and the tube. The tube's external surface is coated on the sides with a conductive coating, e.g. graphite, which is connected to a ground potential. In this case, there is also capacitance between the tube's anode and the ground. A voltage division, capacitive for the tube's anode, is formed of these capacitances, the capacitances of the voltage division being charged and discharged by pulses occurring in the deflecting coils. In FIG. 1, a capacitor Ca represents the capacitance between the deflecting coil Def and the anode A. A reference Cg represents the capacitance between the tube's anode and the ground.

The electric fields produced by the windings of a deflecting coil and the conductors connected thereto on the sides and at the back of a display terminal can fairly easily be damped by enclosing the cathode ray tube at the back and on its sides inside a metal or plastic case, which is coated with an electrically conductive coating. In this case, the electric field that is directed straight forwards remains a problem.

A well-known method for reducing an electric field that is directed forwards is to enlarge the capacitance Cg between the tube's anode and the ground, whereupon the voltage pulses that occur on the tube's anode become smaller and the electric field produced by the anode becomes smaller. This can be implemented in many different ways, e.g. by coating the tube's image surface with a transparent electrically conductive film, which is grounded. However, the method is fairly expensive and the film may impair the image quality, and it may become scratched when cleaning the tube.

FIG. 2 shows, at a level of a principle, another well-known method for reducing voltage pulses that occur on an anode. There, pulses Pn, opposite in direction to pulses Pp produced by the deflecting coil of an anode voltage circuit Va, are summed. The summing takes place capacitively via a capacitor Cc. A circuit D supplies deflecting coils Dy. From the same circuit, deflecting pulses are coupled to a compensation coil L, which reverses the pulses in comparison with the pulses, which are coupled to the tube's anode via the deflecting coils and the capacitance Ca. The compensation coil is dimensioned so that as a result of the summing of the pulses Pn opposite in direction that takes place on the tube's anode, the sum voltage pulses that occur on the anode are reduced as much as possible. Instead of the tube's anode, the pulses Pn, opposite in direction, can also be coupled to electrodes on the tube's sides or to an electrode circulating around the tube.

In compensation methods according to prior art, the basis is that the produced fields have extremely low frequencies and they are produced by the picture tube's vertical deflecting pulses and they have slightly higher frequencies and they are produced by the picture tube's horizontal deflecting pulses.

SUMMARY OF THE INVENTION

The objective of the invention is to reduce electric fields produced by a display terminal or monitor equipped with a cathode ray tube in its surroundings taking into consideration, in particular, the most common operating situations of the monitor and the electric fields occurring therein.

The present invention flows from the recognition that the picture content presented by the picture tube also has a major impact on the electric field produced by the tube's anode, whereupon the aforementioned compensation methods according to prior art do not produce the best possible result. The objective of the invention is to develop a compensation method that reduces the electric field produced by a cathode ray tube in its surroundings as effectively as possible by the most commonly used picture content types.

The objectives of the invention are achieved by analysing in a frequency domain the electric field produced by the picture tube's anode and by examining which components of the frequency spectrum are the strongest and which factors affect different spectrum components. On the basis of the produced result, a compensation method is developed, wherein the frequency spectrum components are weighted in different ways based on the analysis. That what is presented in claim 1 is characteristic to the method according to the invention.

The invention also relates to a compensation device, the amplification and frequency response of which is optimised taking into consideration the effect of the picture content on the electric field produced by the picture tube's anode. That what is presented in claim 7 is characteristic to the device according to the invention.

BRIEF DESCRIPTION OF THE DRAWINGS

In the following, the invention will be described in more detail by referring to the preferred embodiments presented as an example and the enclosed drawings, in which.

DETAILED DESCRIPTION OF THE DRAWINGS

Figure 1:
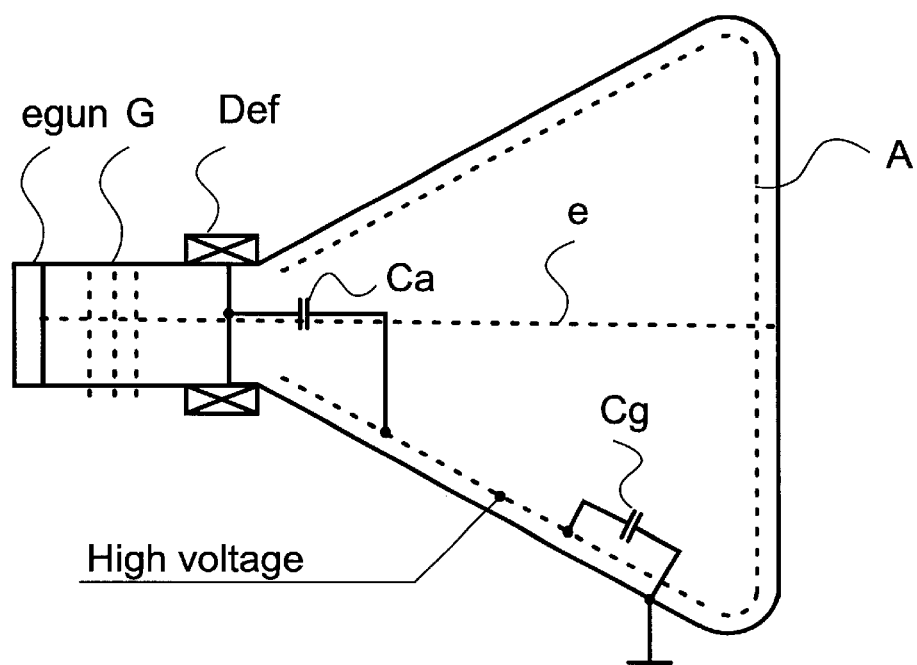
FIG. 1 shows a cathode ray tube.
Figure 2:
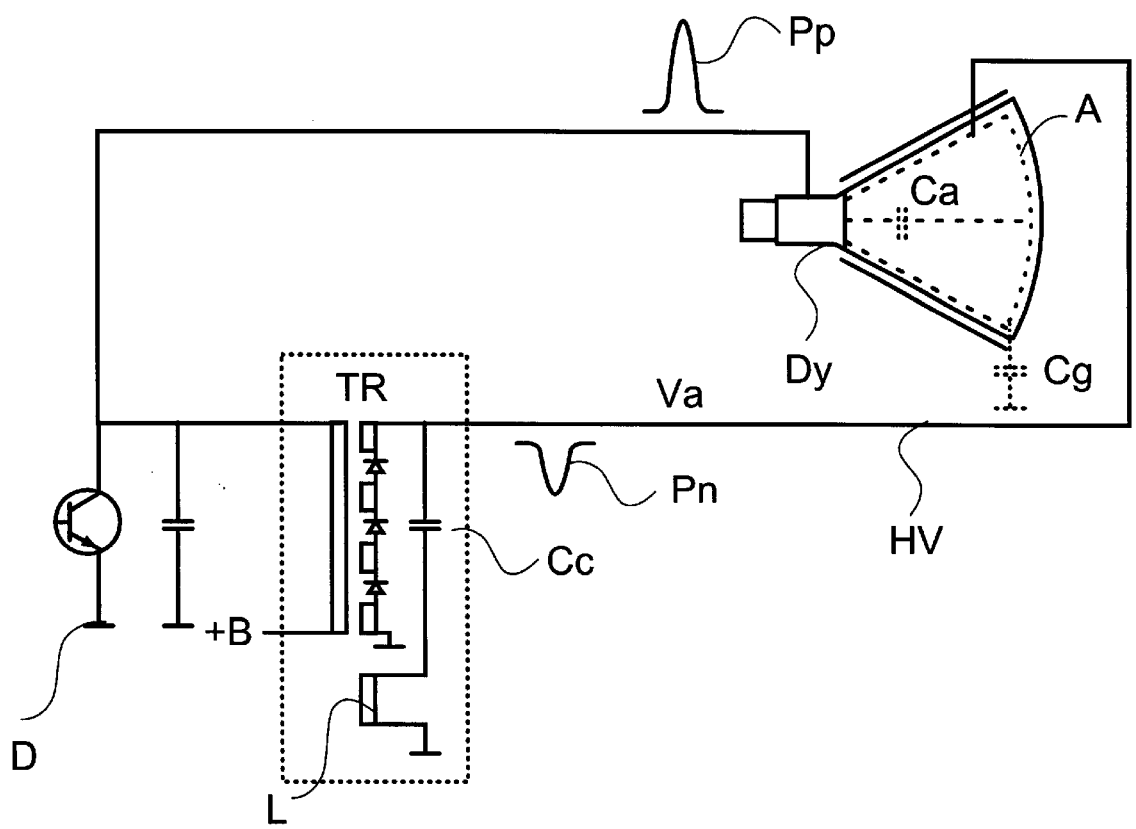
FIG. 2 shows a damping connection of an electric field produced by a picture tube's anode, according to prior art.
Figure 3:
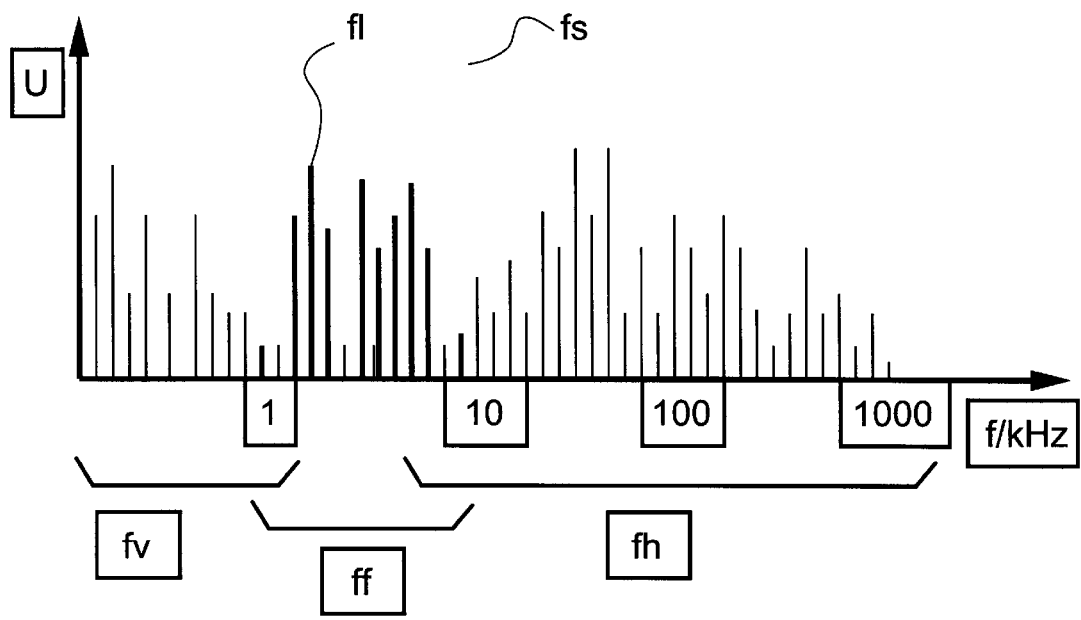
FIG. 3 shows a frequency spectrum presentation of pulses that occur on a picture tube's anode, when there is picture content on a monitor's display.

FIG. 3 shows in a simplified manner a frequency spectrum fs of a pulse-like voltage that occurs on a picture tube's anode. This voltage produces a variable electric field in the picture tube's surroundings. It is well known that in addition to a component that has a basic frequency, a pulse-like signal contains multiple frequencies of the basic frequency. It depends on the shape of the pulse whether it contains even or odd multiples or both. The more sharp-edged and narrower the pulse is the larger number of multiple frequencies it contains.

In FIG. 3, it is possible to distinguish the following generators of the variable electric field. Typically, the vertical deflecting frequency of monitors is within the range of 48 Hz–150 Hz. Vertical deflecting pulses contain significant multiple frequencies up to the kHz range. Typically, the horizontal deflecting frequencies of monitors are within the range of 15 kHz–125 kHz. The multiple frequencies of horizontal deflecting pulses even come up to the MHz range. A horizontal deflecting signal's envelope also produces lower frequencies than the basic frequency of a horizontal deflecting signal. Thus, horizontal and vertical deflecting signals produce a frequency spectrum, which reaches from the lowest vertical deflecting frequency to the MHz range, but the spectrum components caused by them are fairly weak within the frequency range of 1 kHz–10 kHz. The most important multiple frequency producers are deflecting signals' flyback pulses, which are short and sharp-edged.

Variations in the picture tube's anode voltage also depend on the information presented on the display. The highest anode voltage variations are caused when an image is presented on the picture tube, wherein e.g. one half of the image is bright white and the other half is black. In this case, the anode voltage fluctuation can be hundreds of volts and the strength of the variable electric field is at its maximum.

The compensation circuit can be optimised according to these kinds of worst situations as has been done in devices according to prior art. The present invention is based on the observation that the optimisation of a compensation circuit using such situations as basis will result in that the compensation is not good after all in situations, where the monitor is normally used. No computer user will continuously look on the monitor at an image one half of which is white and the other half is black. Most usually, word processing, spreadsheet, drawing programs, etc. are used in computers.

We have arrived at the invention by examining frequency spectrums of a variable electric field produced by various picture contents to find the best possible compensation method. When studying with a word processing program which factors affect the frequency of the strongest spectrum components produced by the picture content, a connection was found between the number of text lines and the vertical deflecting frequency. The strongest frequency component= number of lines x vertical deflecting frequency (Hz). For example, when using a vertical deflecting frequency of 85 Hz and 40 lines on the display, this will produce the strongest frequency component produced by the picture content for a frequency of 3400 Hz. Assuming that the most typical picture contents correspond to a situation where 20–60 lines are shown on the display and the vertical deflecting frequencies vary between 50 Hz–150Hz, the strongest spectrum component, fl in FIG. 3, produced by the picture content may settle in between 1 kHz–9 kHz. Thus, a spectrum ff produced by the picture content goes typically partly on top of the upper end of a spectrum fv produced by the vertical deflecting signal and on top of the lower end of a spectrum produced by a horizontal deflecting signal fh, but the spectrum components produced by the deflecting signals for this area are considerably weaker than those produced by the picture content.

The invention is based on a realisation that frequency components produced by the picture content can be discriminated from the interfering frequency spectrum, after which the frequency spectrums produced by the different sources can be processed separately and supplied to the same compensation antenna.

A monitor's electric field with a variable frequency is directed to the front, because the front side cannot be shielded by a metal enclosure. The objective of the invention is to produce as good a compensation signal as possible, which is to be supplied to either the tube's anode or separate electrodes, antennas, which are on the tube's sides or circulate around the tube. The compensation signal produces an electric field, which is opposite in direction to the electric field produced by the monitor, and compensates it.

It is noted in the frequency spectrum presentation in FIG. 3 that there are significant frequency components in an extremely wide frequency range. In addition, the levels of the frequency components produced by different sources vary. This causes problems if a single antenna is used for producing an electric field opposite in direction. The electric field produced by the antenna is greatly dependent on the frequency of the signal supplied to it. The antenna goes into a resonance at certain frequencies and, in this case, produces an extremely strong electric field around it, when the frequency supplied to the antenna is far from the resonance frequency, the electric field produced by it is very small. One solution is to use several antennas tuned for different frequencies, but the solution is however troublesome and expensive. If a compensation signal is supplied to the picture tube's anode, it is extremely difficult to influence the anode's radiation properties.

Figure 4:
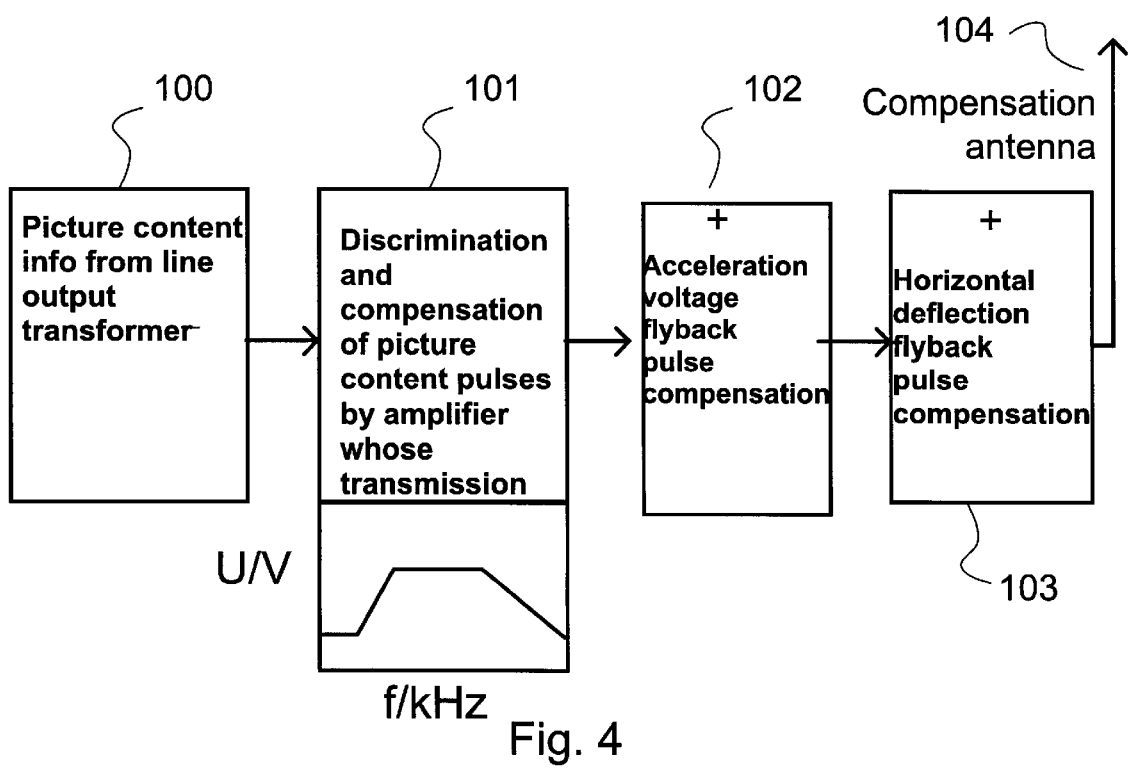
FIG. 4 shows in flow diagram form a damping method of an electric field produced by a tube's anode, according to the invention.

The diagram in FIG. 4 shows a preferred application of a method according to the invention. Picture content information 101 is discriminated from a high voltage 100 produced by a high voltage transformer. A compensation signal obtained from the picture content is summed with a compensation signal 102 of the acceleration voltage flyback pulse and further with a compensation signal 103 of the horizontal deflection flyback pulse. The obtained sum signal is supplied to a compensation antenna 104.

Figure 5:
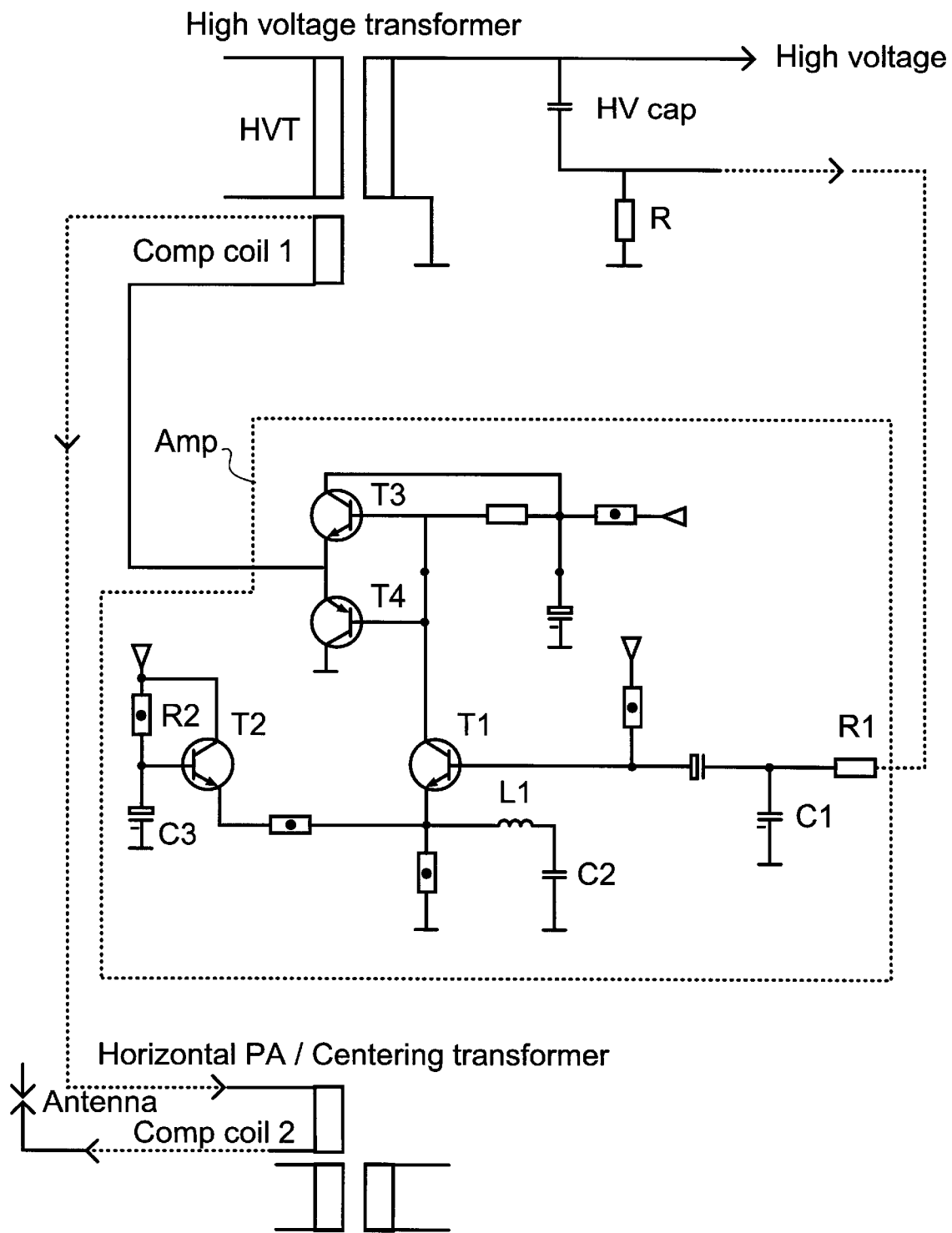
FIG. 5 shows a connection for establishing a reverse compensation signal taking into consideration the picture content, acceleration voltage fly back pulse and horizontal deflecting fly back pulse.

In the following, the separation of frequency components caused by the picture content and the circuit connection suitable for it will be described in more detail in the light of examples and by referring to FIG. 5, which shows a connection implementing a method according to the invention.

An essential thing as regards the invention is the separation of the frequency components caused by the picture content from the frequency spectrum. It can be done, e.g. as follows. The picture content causes variation in the high voltage, i.e. anode voltage. The high voltage variation data is obtained, e.g. in accordance with FIG. 5, from a high-voltage transformer HVT by connecting a capacitor HV-cap from the high voltage to the terminal of a resistor R. The so-called ripple current of a filtering capacitor produces in the resistor a voltage proportional to the variation in the high voltage. This voltage is connected to the input of an amplifier Amp. However, frequency components other than those produced by the picture content also occur in the high voltage, but there is a desire only to discriminate from the frequency spectrum the frequency components produced by the picture content, and to amplify them.

The amplifier Amp is a band-pass-type tuned amplifier designed to amplify the frequency components produced by the picture content in the high voltage, i.e. substantially a frequency range of 1 kHz–10 kHz. A resonance circuit L1/C2 on the emitter of a transistor T1 is in resonance at a frequency of 5 KHz. In this case, the impedance of the transistors emitter circuit is the lowest and the amplifier's amplification is the highest. The bandwidth of the amplifier can be adjusted by the resonance circuit quality value (Q-value) and the amplification can be set appropriate by a current mirror connection T2, R2, C3 on the emitter of the transistor T1. The amplification of the amplifier can also be made continuously adjustable, for example, by a adjustable resistor or by adjusting the current mirror by means of a digital-analog converter. In this case, each connection can be adjusted equipment-specifically. Components R1 and C1 at the input of the amplification stage act as a low-pass filter and filter out frequency components that are above a frequency of 10 kHz. A so-called totem pole output stage T3, T4, by means of which a sufficient output power is produced, is connected to a collector of the transistor T1. Thus, an amplified signal which is in an opposite phase in relation to the voltage variation, caused by the picture content, that occurs in the high voltage can be obtained from the amplifier output, which signal is then connected to the antenna.

According to the objective of the invention, the amplification of the amplifier, i.e. the signal level, can now be adjusted so that the electric field produced by the antenna compensates the electric field produced by the monitor's picture content, as well as possible. The adjustment does not substantially affect fields produced by other sources, such as deflecting signals. Compensation signals of other electric fields can correspondingly be discriminated from the overall spectrum or they can be found in the connection in such a place where only the signal in question occurs. In this case, the level of each compensation signal can be separately adjusted without affecting the levels of other signals. After that, all compensation signals can be summed for the same antenna and the level of each compensation signal can be separately adjusted and, thus, simultaneously compensate the frequency dependency of the antenna's amplification. This can not be done if we use a common linear amplifier according to prior art, which amplifies all frequency components produced from different sources.

In the following, the generation of several separate compensation signals and their summing for a common antenna, according to the invention, will be described in more detail in the light of example and by referring to FIG. 5, which shows a connection implementing a method according to the invention.

Let us assume a case where, in addition to the aforementioned variation in the anode voltage due to the picture content, the monitor's other most significant sources of a varying electric field are the acceleration voltage generation fly-back pulse that occurs in the high-voltage transformer and the horizontal deflection fly-back pulse that occurs at horizontal deflection stages. The electric field produced by the acceleration voltage fly-back pulse is mainly produced in the coil of the high-voltage transformer and the wiring related thereto. The electric field produced by the horizontal deflection fly-back pulse is mainly produced in the horizontal deflection coils and on the picture tube's anode to which the pulses connect via capacitance between the deflecting coils and the tube's anode.

The compensation of a varying electric field due to the picture content was described above. In this case, the reverse acceleration voltage fly-back pulse and the reverse horizontal deflection fly-back pulse should also be summed to the signal in question. The acceleration voltage fly-back pulses can be seen in the primary coil of the high-voltage transformer. The fly-back pulses can be separated from the transformer, e.g. with a Comp coil 1, which is on top or beside the primary coil. In this case, the primary coil current pulses induce for the coil in question a voltage proportional to the fly-back pulses. The voltage level can be adjusted by the number of turns of a winding, and the direction of the pulse produced in the coil can be determined by the direction of the winding. This coil can be connected to the output of the amplifier Amp, whereupon the reverse acceleration voltage fly-back pulses are summed with the compensation signal of the varying electric field caused by picture content.

The horizontal deflection fly-back pulses can be seen, for example, at the horizontal deflection output stage in the horizontal deflection coils and on the picture tube's anode. At the horizontal deflection output stage, there is a centering transformer from which fly-back pulse information can be separated using the same method as for the acceleration voltage fly-back pulse information, i.e. by an additional coil Comp coil 2. The pulse level can again be adjusted by the number of windings turns and the direction of the pulses by the direction of winding turns. When the Comp coil 2 is connected in series with the Comp coil 1, the reverse horizontal deflection fly-back pulses can be summed with the compensation signal. The other end of the Comp coil 2 is connected to the antenna, whereupon the antenna is supplied by a sum signal wherein the level of all three compensation signals separated from different sources can be separately adjusted, independent of each other.

In the example, the frequency components due to the picture content were separated by a selective, active phase reversing amplifier and the other frequency components to be summed by passive transformer connections. It will be appreciated by a person skilled in the art that passive connections can also be made into frequency selective ones, e.g. by resonance circuits, and the transformers themselves are dimensioned for a given frequency range and, therefore, it is possible to separate specific frequency components from the frequency spectrum even with passive connections. It will also be appreciated by a person skilled in the art that the number, summing order and the bandwidths of the signals to be summed can be changed as the need arises.

The invention can be utilised in all devices that use a cathode ray tube as a display device, such as in computer monitors, control monitors, television receivers, measuring instruments, etc.

This paper presents the implementation and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus, the possibilities of implementing and using the invention are only restricted by the enclosed claims. Consequently, the various options of implementing the invention as determined by the claims, including the equivalent implementations, also belong to the scope of the invention.

What is claimed is:

1. A method for reducing an electric field produced by a display terminal, equipped with a cathode ray tube, in its surroundings, the electric field being at least partly produced by pulse-like interference voltages which couple from a controlling equipment of the display terminal to the anode of the cathode ray tube, wherein the method comprises separating from a formed frequency spectrum of pulse-like interference voltages at least one frequency range comprising several frequency components;

processing frequency components that occur in different frequency ranges substantially independently of each other; and supplying the processed frequency components to an emitter, which forms a compensating electric field for compensating the electric field produced by the display terminal.

2. A method according to claim 1, wherein the method comprises separating said frequency range from an interference voltage that occurs in a high voltage of the picture tube.

3. A method according to claim 1, wherein said separated frequency band is the frequency band, which contains frequency components substantially produced by the picture content presented on the display.

4. A method according to claim 1, wherein the separately processed frequency bands are summed up after the separate processing for supplying them to a common emitter.

5. A method according to claim 2, wherein a frequency selective amplifier coupling is used for separating said frequency range.

6. A method according to claim 1, wherein said processing of frequency components substantially independently of each other contains the adjustment of the level of each frequency component independently of the other frequency components.

7. A display terminal having a cathode ray tube as a display which has an anode and control equipment for controlling the cathode ray tube, whereupon when the display terminal is being switched on, pulse-like interference signals couple from the control equipment onto the cathode ray tube's anode producing on the anode an overall interference voltage frequency spectrum, which contains several interfering frequency components, and an electric field in the display terminal's surroundings, wherein the display terminal comprises:

a first means for separating interfering frequency components in at least one frequency range from the overall interference voltage frequency spectrum;

a second means for processing interfering frequency components of each frequency range independently of the other interfering frequency components;

a third means for summing the processed interfering frequency components of the overall interference voltage spectrum with each other; and an emitter for receiving the summed interfering frequency components, for producing a compensating electric field on the basis of the received summed interfering frequency components, and for radiating the compensating electric field for compensating the electric field produced by the picture content.

8. A display terminal according to claim 7, wherein said first means is arranged to separate the frequency range, which contains the interfering frequency components produced by the picture content.

9. A display terminal according to claim 7, wherein said first means is arranged to separate the frequency range, which contains the interfering frequency components produced by a vertical deflection signal of the cathode ray tube.

10. A display terminal according to claim 7, wherein said first means is arranged to separate the frequency range, which contains the interfering frequency components produced by a horizontal deflection signal of the cathode ray tube.

11. A display terminal according to claim 7, wherein said second means is arranged to adjust the level of the voltage of the interfering frequency components of each frequency range independently of the level of an interfering frequency components of the other frequency ranges.

12. A display terminal according to claim 7, comprising of a band-pass type amplifier as a means carrying out the activities of the first and the second means.

13. A display terminal according to claim 12, wherein the medium frequency and bandwidth of the band-pass type amplifier are adapted to separate the frequency band produced by the picture content from the interference voltage frequency spectrum.

14. A method for reducing an electric field produced by a display terminal, equipped with a cathode ray tube, in its surroundings, the electric field being at least partly produced by pulse-like interference voltages which couple from a controlling equipment of the display terminal to an anode of the cathode ray tube, the method comprising the steps of:

separating from a formed frequency spectrum of pulse-like interference voltages at least one frequency range comprising several frequency components, wherein the separated frequency range is a frequency band that contains frequency components substantially produced by a picture content presented on the display terminal;

processing frequency components that occur in different frequency ranges substantially independently of each other; and supplying the processed frequency components to an emitter, which forms a compensating electric field for compensating the electric field produced by the display terminal.

15. A display terminal having a cathode ray tube as a display, which has an anode and control equipment for controlling the cathode ray tube, whereupon when the display terminal is being switched on, pulse-like interference signals couple from the control equipment onto the cathode ray tube's anode producing on the anode an overall interference voltage frequency spectrum, which contains several interfering frequency components, and an electric field in the display terminal's surroundings, wherein the display terminal comprises:

a first means for separating interfering frequency components in at least one frequency range from the overall interference voltage frequency spectrum wherein the first means is arranged to separate the frequency range which contains the interfering frequency components produced by the picture content;

a second means for processing interfering frequency components of each frequency range independently of the other interfering frequency components;

a third means for summing the processed interfering frequency components of the overall interference voltage spectrum with each other; and an emitter for receiving the summed interfering frequency components, for producing a compensating electric field on the basis of the received summed interfering frequency components, and for radiating the compensating electric field for compensating the electric field produced by the picture content.

\* \* \* \* \*